United States Patent
Reimer

(10) Patent No.: US 6,573,732 B1
(45) Date of Patent: Jun. 3, 2003

(54) DYNAMIC RANGE SENSOR AND METHOD OF DETECTING NEAR FIELD ECHO SIGNALS

(75) Inventor: Lawrence B. Reimer, Janesville, WI (US)

(73) Assignee: SSI Technologies, Inc., Janesville, WI (US)

( * ) Notice: Subject to any disclaimer, the term of this patent is extended or adjusted under 35 U.S.C. 154(b) by 0 days.

(21) Appl. No.: 09/587,740

(22) Filed: Jun. 5, 2000

Related U.S. Application Data

(63) Continuation-in-part of application No. 09/562,225, filed on Apr. 28, 2000, now Pat. No. 6,484,088.
(60) Provisional application No. 60/132,497, filed on May 4, 1999.

(51) Int. Cl.$^7$ .............................................. G01R 27/04
(52) U.S. Cl. ............................................................ 324/644
(58) Field of Search ............................... 324/637, 642, 324/644; 327/172; 73/24.01, 754

(56) References Cited

U.S. PATENT DOCUMENTS

| | | | | |
|---|---|---|---|---|
| 3,800,242 A | * | 3/1974 | Zimmerman et al. | 331/66 |
| 4,135,397 A | * | 1/1979 | Krake | 73/290 R |
| 4,217,644 A | | 8/1980 | Kato et al. | 701/123 |
| 4,296,472 A | | 10/1981 | Sarkis | 702/52 |
| 4,523,460 A | * | 6/1985 | Strickler et al. | 73/200 |
| 4,531,406 A | | 7/1985 | Fritz | 73/290 V |
| 4,700,569 A | | 10/1987 | Michalski et al. | 73/290 V |
| 4,843,575 A | | 6/1989 | Crane | 701/99 |
| 4,853,694 A | | 8/1989 | Tomecek | 340/621 |
| 4,868,797 A | | 9/1989 | Soltz | 367/98 |
| 4,964,065 A | * | 10/1990 | Hicks et al. | 364/514 |
| 5,089,989 A | * | 2/1992 | Schmidt et al. | 367/35 |
| 5,131,271 A | | 7/1992 | Haynes et al. | 73/290 V |
| 5,157,700 A | * | 10/1992 | Kurosawa et al. | 378/34 |
| 5,408,418 A | | 4/1995 | Lippmann et al. | 702/53 |
| 5,530,680 A | * | 6/1996 | Whitehurst | 367/99 |
| 5,668,310 A | | 9/1997 | Parkman et al. | 73/113 |
| 5,670,886 A | * | 9/1997 | Wolff et al. | 324/644 |
| 5,693,154 A | * | 12/1997 | Clark et al. | 148/301 |

(List continued on next page.)

FOREIGN PATENT DOCUMENTS

| | | |
|---|---|---|
| EP | 0 644 404 A1 | 3/1995 |
| FR | 2 710 743 | 4/1995 |
| GR | DE 295 08 577 U 1 | 9/1995 |
| WO | WO 88/04031 | 6/1988 |

*Primary Examiner*—Safet Metjahic
*Assistant Examiner*—Etienne P LeRoux
(74) *Attorney, Agent, or Firm*—Michael Best & Friedrich LLP

(57) ABSTRACT

A dynamic range sensor that measures the distance to a target or amount of material in a container. The sensor has a transducer and a controller that is coupled to the transducer. The controller generates a first command signal for the transducer, detects a first echo signal from the transducer, and determines whether the first echo signal was received by the transducer within a near-field time. If the first echo signal was received within the near-field time, the controller detects a second echo signal of a predetermined magnitude. If a second echo signal is not detected within a predetermined amount of time, the controller ignores the first echo signal and generates a second command signal different than the first command signal. The controller modifies the second command signal until a second echo signal is detected. The controller converts either the first echo signal or the difference between the first echo signal and the second echo signal to a distance measurement or volumetric representation of the amount of material in the container. Preferably, the transducer is driven at resonance with a series of pulses such that the frequency of the pulses matches the transducer's temperature-dependent frequency characteristics.

30 Claims, 6 Drawing Sheets

U.S. PATENT DOCUMENTS

| | | | |
|---|---|---|---|
| 5,751,611 A | 5/1998 | Jamieson | 345/35 |
| 5,768,939 A | 6/1998 | Quayle et al. | 73/290 V |
| 5,790,973 A | 8/1998 | Blaker et al. | 455/456 |
| 5,814,830 A | 9/1998 | Crowne | 250/577 |
| 6,006,604 A | 12/1999 | Rabelo et al. | 73/290 R |
| 6,018,247 A * | 1/2000 | Kelly | 324/644 |
| 6,052,629 A | 4/2000 | Leatherman et al. | 700/241 |
| 6,078,850 A | 6/2000 | Kane et al. | 701/29 |
| 6,122,975 A * | 9/2000 | Sridhar et al. | 73/754 |
| 6,252,446 B1 * | 6/2001 | Zielinski et al. | 327/172 |
| 6,279,379 B1 * | 8/2001 | Logue et al. | 73/24.01 |
| 6,373,261 B1 * | 4/2002 | Kielb et al. | 324/644 |

\* cited by examiner

| Ambient Temperature | | Duty cycle and period | | Pulse periods in clock cycles | | | Time domain values at 121.21nsecs per clock cycle | | |
|---|---|---|---|---|---|---|---|---|---|
| Low | High | Duty on cycle | Total period | on pulse period | off pulse period | total period | On Pulse Width | Off Pulse Width | Frequency |
| Default | 50.5 | 0 | 15 | 17 | 40 | 57 | 2061 | 4848 | 144.74 |
| -50 | -46.5 | 2 | 21 | 25 | 20 | 45 | 3030 | 2424 | 183.34 |
| -46 | -38.5 | 2 | 20 | 25 | 21 | 46 | 3030 | 2545 | 179.35 |
| -38 | -31.5 | 2 | 1F | 25 | 22 | 47 | 3030 | 2667 | 175.53 |
| -31 | -24.5 | 2 | 1E | 25 | 23 | 48 | 3030 | 2788 | 171.88 |
| -24 | -17.5 | 1 | 1D | 21 | 28 | 49 | 2545 | 3394 | 168.37 |
| -17 | -10.5 | 1 | 1C | 21 | 29 | 50 | 2545 | 3515 | 165.00 |
| -10 | -4.5 | 1 | 1B | 21 | 30 | 51 | 2545 | 3636 | 161.77 |
| -4 | 1.5 | 1 | 1A | 21 | 31 | 52 | 2545 | 3758 | 158.66 |
| 2 | 7.5 | 0 | 19 | 17 | 36 | 53 | 2061 | 4364 | 155.66 |
| 8 | 13.5 | 0 | 18 | 17 | 37 | 54 | 2061 | 4485 | 152.78 |
| 14 | 18.5 | 0 | 17 | 17 | 38 | 55 | 2061 | 4606 | 150.00 |
| 19 | 23.5 | 0 | 16 | 17 | 39 | 56 | 2061 | 4727 | 147.32 |
| 24 | 29.5 | 0 | 15 | 17 | 40 | 57 | 2061 | 4848 | 144.74 |
| 30 | 33.5 | 0 | 14 | 17 | 41 | 58 | 2061 | 4970 | 142.24 |
| 34 | 38.5 | 0 | 13 | 17 | 42 | 59 | 2061 | 5091 | 139.83 |
| 39 | 43.5 | 0 | 12 | 17 | 43 | 60 | 2061 | 5212 | 137.50 |
| 44 | 47.5 | 0 | 11 | 17 | 44 | 61 | 2061 | 5333 | 135.25 |
| 48 | 51.5 | 0 | 10 | 17 | 45 | 62 | 2061 | 5454 | 133.07 |
| 52 | 56.5 | 0 | 0F | 17 | 46 | 63 | 2061 | 5576 | 130.95 |
| 57 | 60.5 | 0 | 0E | 17 | 47 | 64 | 2061 | 5697 | 128.91 |
| 61 | 64.5 | 0 | 0D | 17 | 48 | 65 | 2061 | 5818 | 126.93 |
| 65 | 67.5 | 0 | 0C | 17 | 49 | 66 | 2061 | 5939 | 125.00 |
| 68 | 71.5 | 0 | 0B | 17 | 50 | 67 | 2061 | 6061 | 123.14 |
| 72 | 75.5 | 0 | 0A | 17 | 51 | 68 | 2061 | 6182 | 121.33 |
| 76 | 78.5 | 0 | 09 | 17 | 52 | 69 | 2061 | 6303 | 119.57 |
| 79 | 81.5 | 0 | 08 | 17 | 53 | 70 | 2061 | 6424 | 117.86 |
| 82 | 84.5 | 0 | 07 | 17 | 54 | 71 | 2061 | 6545 | 116.20 |
| 85 | 88.5 | 0 | 06 | 17 | 55 | 72 | 2061 | 6667 | 114.59 |
| 89 | 91.5 | 0 | 05 | 17 | 56 | 73 | 2061 | 6788 | 113.02 |
| 92 | 94.5 | 0 | 04 | 17 | 57 | 74 | 2061 | 6909 | 111.49 |
| 95 | 97.5 | 0 | 03 | 17 | 58 | 75 | 2061 | 7030 | 110.00 |
| 98 | 100.5 | 0 | 02 | 17 | 59 | 76 | 2061 | 7151 | 108.55 |
| 101 | 103.5 | 0 | 01 | 17 | 60 | 77 | 2061 | 7273 | 107.14 |
| 104 | 105 | 0 | 00 | 17 | 61 | 78 | 2061 | 7394 | 105.77 |
| 105 | Default | 0 | 15 | 17 | 40 | 57 | 2061 | 4848 | 144.74 |

Fig. 8 dynamic range sensor and method
of detecting near field echo
signals

The present application is a continuation-in-part of application Ser. No. 09/562,225 filed Apr. 28, 2000 now U.S. Pat. No. 6,484,088. Non-provisional application Ser. No. 09/562,225 claims the benefit and priority of prior provisional application No. 60/132,497, filed on May 4, 1999.

BACKGROUND OF THE INVENTION

The present invention relates to devices that measure the volume of fluids, liquids, or pulverous solids or the distance from a predetermined point to a target. More particularly, the present invention relates to a sensor that provides accurate measurements of volume or distance in near-field conditions.

Fuel, lubricants, bulk solids, and a variety of other materials are stored in tanks and similar containers and then consumed by being drawn from the container as needed. In virtually all storage applications, the level (or volume) of the material in the storage container is monitored to ensure that the supply of material does not unexpectedly run out. Measurement sticks, electro-mechanical sensors, ultrasonic sensors, and other devices are used to monitor material levels.

While known level monitoring devices are functional, they do not provide satisfactory accuracy and information regarding the amount of material in a storage tank. Measurement sticks are undesirable because they require human manipulation. The measurement stick must be manually inserted into the material and then the markings on the stick must be read to determine an indication of the amount of material in the container. Measurement readings are subject to human error. Worse, if no person is available to take a reading, the amount of material in the tank cannot be determined.

Electro-mechanical level sensors ("e-m sensors") function automatically and don't require human intervention. Nevertheless, these devices suffer from several deficiencies. First, e-m sensors must be calibrated to the size of the tank in which they are installed. Second, e-m sensors provide only one type of information, a measurement of the percentage of material remaining in the tank: such as the common "F," "¾," "½," "¼," and "E" level designations. Third, e-m sensors use mechanical floats. Float devices often register inaccurate readings due to changes in tank orientation, which occur when storage tanks are mounted in vehicles. Lastly, e-m sensors are unreliable due to failures in their moving parts.

Ultrasonic sensors don't rely on mechanical floats. Instead, ultrasonic sensors measure an echo signal reflected off the surface of the material in the storage tank. Nevertheless, ultrasonic sensors are affected by a variety of environmental variables, such as temperature, target location, target composition and motion, transmission media, and acoustic noise. Most known ultrasonic sensors fail to adequately compensate for changes in one or more of these variables. In particular, most ultrasonic level sensors are unable to accurately measure material levels when the surface of the material is close to the ultrasonic transducer in the sensor.

A conventional ultrasonic level sensor 10 is shown in FIG. 1. The sensor 10 is controlled by a driver (not shown). The driver generates electrical signals that are delivered to a transducer (not shown), within the sensor. The transducer is a resonant piezoelectric element that vibrates in response to the electrical signals from the driver. The oscillation of the piezoelectric element creates a sound wave 12 that propagates from the sensor 10 to a target 14. When the sound wave 12 reaches the target 14, at least a portion of it is reflected back toward the sensor 10 as an echo signal 16.

The sensor 10 measures the amount of time required for the sound wave 12 to travel to the target 14 and the echo signal 16 to travel from the target 14 back to the sensor 10. The time needed for the sound to make this round trip is referred to as the time of flight ("TOF"), and may be used by a microprocessor (not shown) coupled to the sensor to calculate the distance of the target from the sensor. If the sensor is mounted on a container, the distance measurement may be used to calculate a volumetric representation of the amount of material in a container.

The transducer continues to vibrate for a certain period of time after the signals from the driver 30 are removed or reduced to zero magnitude. This time is referred to as a "ring time." The ring time of an ultrasonic sensor such as the sensor 10 is dependent on numerous variables including temperature, humidity, the magnitude of the drive signal applied, and the type of crystal used in the transducer. Generally, rings times range from a few microseconds to 2000 $\mu$secs.

When an ultrasonic sensor, such as the sensor 10, attempts to measure the level of a material whose surface is very close to the transducer, the echo signal returns to the transducer before the end of the transducer ring time. The sensor does not detect an echo that occurs while the transducer is still ringing. The undetected echo signal, however, reflects off of the sensor and back to the target a second time and sometimes multiple times. By the time multiple reflections occur, the transducer stops ringing. The transducer then detects a second, third, or consecutive reflection and mistakes it for the first reflection. This situation is shown in FIG. 2. A drive pulse DP causes the transducer to ring for a certain ring time which is detected as a low signal on a detect signal line. An echo pulse EC received during the ring time is not differentiated on the detect signal line from the low signal produced by the ringing oscillator. Thus, no echo detection occurs until after the oscillator has stopped ringing.

Detection of an echo reflection rather than the first echo causes a sensor to produce erroneous measurements. In the worst-case scenario, the time of flight measurement error approaches twice the ring time of the transducer. For a sensor with a ring time of 500 $\mu$secs and a full-scale range of one meter the error is:

Error=2×(speed of sound×ring time)/2=346 m/s×500e-6 meters= 0.173 meters or 17.3%

An error of this magnitude is unacceptably large for many applications. Accordingly, a number of approaches have been developed to address the problem. One approach to the problem is to use two transducers: one for receiving the sound pulse and one for transmitting the sound pulse. Measurement systems of this type are complex and expensive due to the additional hardware used. Another approach is to use a physical spacer to prevent the sensing of close range targets. Measurement systems of this type have limited usefulness. Yet another approach to the problem is to reduce the ring time of the oscillator with a clamp or dampener. However, a dampened transducer is not as sensitive as a non-dampened transducer. A device can include a spacer and a dampened oscillator, but this is also unsatisfactory.

SUMMARY OF THE INVENTION

Accordingly, there is a need for an improved sensor that provides accurate and enhanced material distance and level information. In particular, there is a need for a sensor that provides accurate material distance and level information in near field conditions (i.e., situations where the surface of the material is physically proximate to the transducer in the sensor).

The present invention provides a near field measurement sensor. The sensor includes a transducer such as an ultrasonic transducer. The transducer is coupled to a controller such as a programmable microprocessor or microcontroller. The controller generates a first command signal for the transducer, detects a first echo signal from the transducer, and determines whether the transducer received the first echo signal within a near-field time. If the first echo signal was received within the near-field time, the controller detects a second echo signal of a predetermined magnitude. If a second echo signal is not detected within a predetermined amount of time, the controller ignores the first echo signal and generates a second command signal different than the first command signal. The controller modifies the second command signal until a second echo signal is detected. The controller converts either the first echo signal or the difference between the first echo signal and the second echo signal to a distance representation to the target or a volumetric representation of the amount of material in the container. Preferably, the transducer is driven at resonance with a series of pulses such that the frequency of the pulses matches the transducer's temperature-dependent frequency characteristics.

To ensure that the controller can distinguish between a true echo signal rather than a secondary echo reflection, the controller is programmed to measure the ring time of the oscillator in the transducer by monitoring the output of the transducer continuously following a trigger command. The controller considers the ring time complete once the detect signal returns high for a predefined period of time. A temperature sensor is coupled to the controller and the controller is programmed to compensate for changes in temperature that can affect ring time and other measurement variables. The controller determines the ring time of the transducer before making each measurement. The near field time is set at about two and one-third times the ring time.

The controller may utilize a look up table to generate a command signal that is a series of pulses tuned to the transducer's resonant frequency. The look up table includes information that is based on temperature. Accordingly, the system includes a temperature sensor to provide temperature information to the controller. Information from the temperature sensor may be distributed to other devices and other locations through a communications module coupled to the controller.

The invention may also be implemented as a method of sensing the level of material in a container, where the ambient temperature of the sensor's surrounding is detected. The method involves generating a signal having a frequency and an amplitude. The signal is sent to a target or surface of the material of interest, a first reflection of the signal from the target is detected according to a timing scheme, and the amplitude and frequency of the signal are controlled according to the detected temperature and the time of detection of the reflection of the signal.

In the case of near field measurements, the method also includes detecting a second reflection, determining the time difference between the first reflection and the second reflection, and converting the time difference between the first reflection and the second reflection to a distance representation or a volumetric representation of the amount of material in the container.

Other features and advantages of the invention will become apparent by consideration of the detailed description and accompanying drawings.

BRIEF DESCRIPTION OF THE DRAWINGS

FIG. 8 is a diagram of a look up table used in the present invention.

DETAILED DESCRIPTION OF THE PREFERRED EMBODIMENTS

Figure 1:
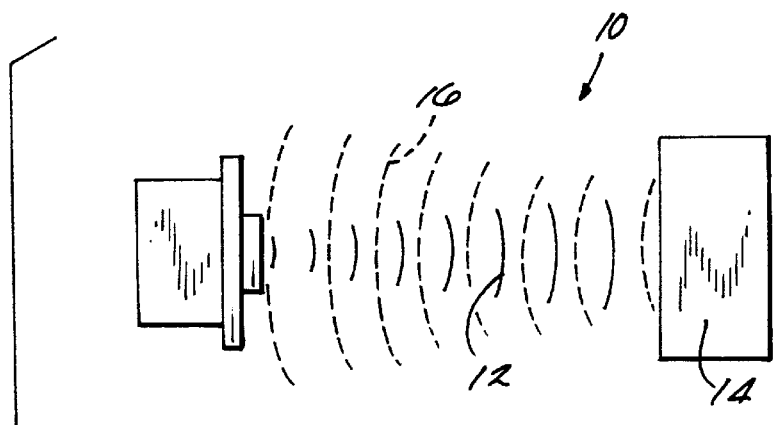
FIG. 1 is a schematic diagram of a level sensor sending a signal to a target and receiving an echo or reflected signal from the target.
Figure 2:
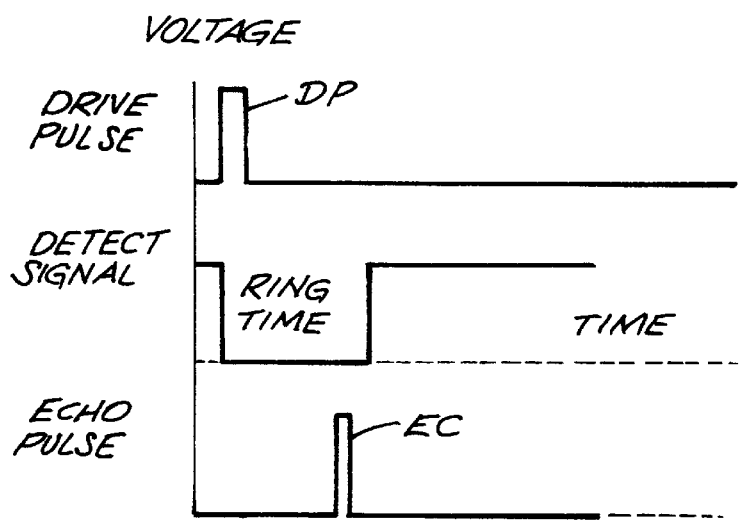
FIG. 2 is a waveform diagram illustrating a near field situation where an echo signal is received during the ring time of a transducer.

Before embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. In particular, it should be understood that the present invention may be used in a wide variety of sensing applications (including distance or volume applications) where accurate near-field measurements are needed.

Figure 3:
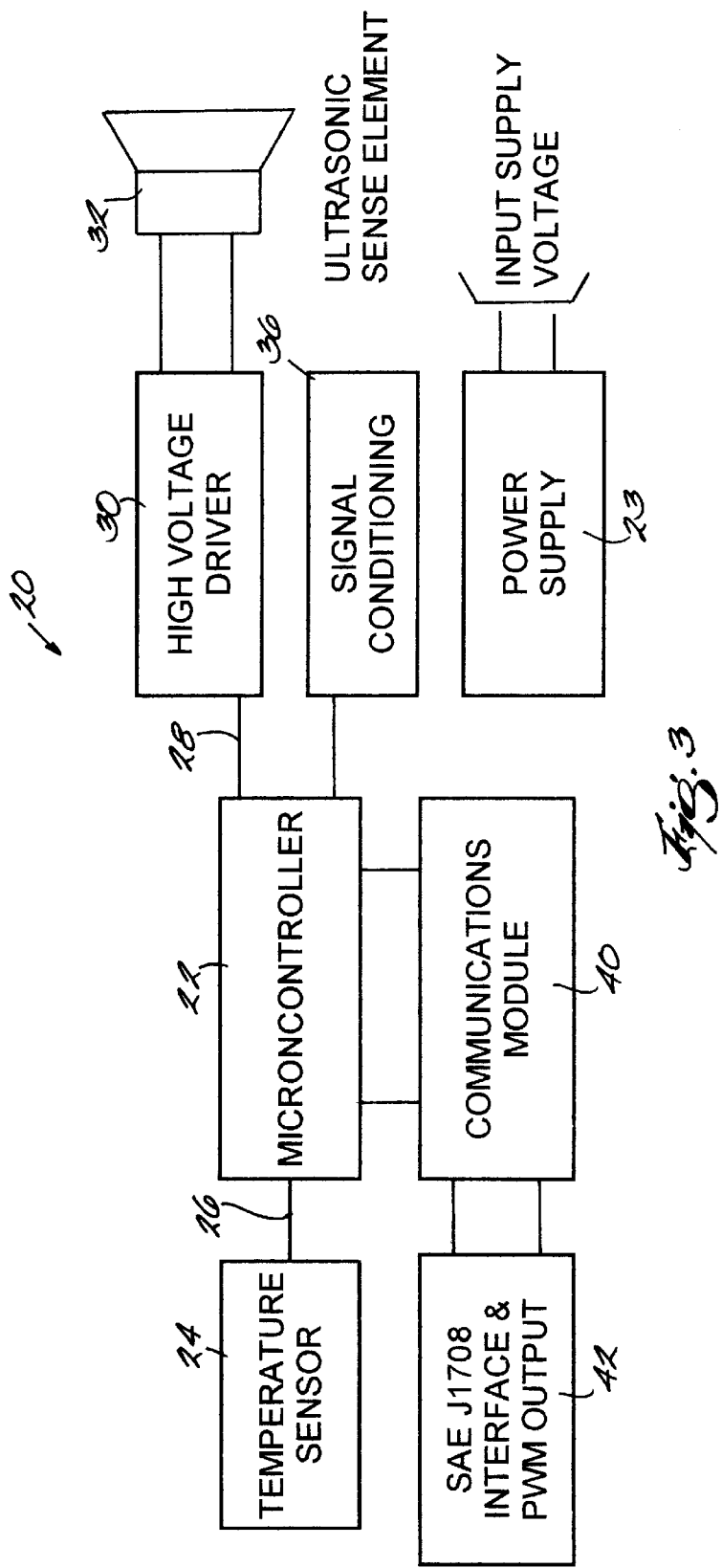
FIG. 3 is a block diagram of a level sensor of the present invention.

FIG. 3 shows an ultrasonic sensor 20 of the present invention powered by a power supply 23. Although an ultrasonic sensor is described herein, other types of echo sensors whether they operate based on light, sound, or other radiation could be used in the invention. Accordingly, the invention is not limited to the ultrasonic sensing example described and illustrated.

The sensor 20 includes a microcontroller 22 and a temperature sensor 24 that senses the temperature of the environment surrounding the sensor 20 and provides a temperature signal along an input link 26 to the microcontroller 22. The microcontroller sends command signals along a link 28 to a driver circuit 30. The driver circuit 30 amplifies the command signals and delivers them to an ultrasonic transducer 32. The amplified signals from the driver 30 cause the oscillator to vibrate and the vibration creates a sound wave that propagates away from the sensor 20.

In addition to producing sound waves, the transducer 32 also detects sound waves. When the transducer 32 is struck by a sound wave (such as an echo), the induced strain causes the transducer to generate a small electrical signal. This electrical signal is amplified by a signal conditioning circuit 36. The signal conditioning circuit may also include a demodulator to remove unwanted AC carrier signals. In this way, the demodulator converts the transducer signal to a form suitable for processing by the microcontroller 22. The microcontroller produces output signals representative of the volumetric amount of material in the container in which the sensor 20 is mounted. The output signals are delivered to a communications module 40, which makes the output signal available to other devices. In the example shown, the communications module is coupled to the data bus interface 42 and an analog device in the form of a fuel gauge.

The sensor 20 is an improvement of the level sensor described in detail in U.S. patent application Ser. No. 09/562,225 filed on Apr. 28, 2000, now U.S. Pat. No. 6,484,088 the disclosure of which is incorporated by reference herein. Thus, much of the discussion regarding the sensor described in that application is applicable to the sensor 20. For purposes of the present discussion, the general operation of the sensor 20 is summarized, while the subject matter related to near field measurement is discussed in greater detail.

The sensor 20 measures target location on a relative scale as a percentage of full-scale distance or full-scale volume, depending on the type of tank or container holding the material being measured.

At start up, the microcontroller 22 runs through a diagnostic sequence to confirm that the temperature sensor 24, transducer 32, driver 30, and signal conditioning circuit 36 are working as expected. If the start-up diagnostics are satisfactory, the microcontroller 22 starts operating in its normal operating mode. Under normal operation, the microcontroller 22 executes a distance measurement periodically, depending on the sensor's overall design range. For short distances of less than about one meter, distance calculations may be conducted every 50 msecs. For longer distances up to about five meters, the distance calculations may be conducted less often, such as every 200 msecs. Each time a calculation is made, the microcontroller 22 reads the ambient temperature from the temperature sensor 24. As will be discussed in more detail below, the microcontroller 22 then calculates an optimal command signal for the transducer 32 based on the ambient temperature and the target's location and composition.

Once the command signal is generated and the transducer activated, the microcontroller 22 measures the time of flight ("TOF") for the sound pulse generated by the transducer to reach the target and the echo to return. In the case of near field targets, and as will be discussed in greater detail, the microcontroller 22 discriminates between single and multiple echoes by measuring the TOF between adjacent echoes. The microcontroller 22 then averages several measurements and filters the average, in order to compensate for movement of the material in the container, as might occur in fuel tanks on moving vehicles. The microcontroller 22 then calculates the target distance based upon the filtered time of flight and the ambient temperature and converts the target location into a percentage of capacity representation of the linear distance or volume, as selectively programmed by the user. The percentage of capacity signal is supplied to the communications module 40 at periodic intervals such as every 200 msecs. The communication module 40 then generates outputs such as a pulse width modulated ("PWM") output and a serial data output that may be used by other devices, such an analog gauge and a vehicle data bus, respectively.

The microcontroller 22 is configured to operate in one of three measurement modes: linear distance, cylindrical level, and rectangular level. In the linear distance mode, the sensor 20 determines a target measurement value (for example, the distance between the sensor and the surface of the material in a tank) and a percentage of capacity value. The percentage of capacity value is directly proportional to the target's position relative to the full-scale distance from the sensor to the bottom of the container. This format is useful in distance measurement applications or in volumetric applications where the change in volume is directly proportional to the measured distance. In the linear distance mode, the microcontroller 22 calculates the percentage of capacity value according to the following equation.

$$\text{Percentage of Capacity} = 800*(TD - FSD)/FSD \qquad \text{(Eqn. 2)}$$

where 800 is a resolution constant to facilitate the programmatic conversion of decimal values to binary values, TD is the distance to the target, and FSD is the full-scale distance or height of the container holding the material being measured.

In the cylindrical level mode, the microcontroller 22 provides a percentage of capacity value that is proportional to the cross-sectional area of the target's level within a horizontal cylindrical tank. In the cylindrical mode, the microcontroller 22 calculates the percentage of capacity value according to the following equation.

$$\text{Percentage of Capacity} = 800*(X\text{Area} - FSA)/FSA \qquad \text{(Eqn. 3)}$$

where 800 is a resolution constant as noted above, XArea is $\pi \times (ra^2) \times \{1 - \arccos[(ra-d0)/ra]/\pi\} + (ra-d0) \times \{(ra^2) - [(ra-d0)^2]\}^{0.5}$ ("ra" is the radius of the container, "d0" is the distance to the target), and FSA is the full-scale area of the container holding the material being measured.

In the rectangular level mode, the sensor 20 provides a percentage of capacity value that is directly proportional to the cross-sectional area of the target media within a horizontal rectangular tank. To perform the proper calculation, the tank width must be preprogrammed into the microcontroller 22. The microcontroller 22 calculates the percentage of capacity value according to the following equation.

$$\text{Percentage of Capacity} = 800 - (X\text{Area} - FSA)/FSA \qquad \text{(Eqn. 4)}$$

where 800 is a resolution constant as noted, XArea is the tank width times the full-scale depth of the container, minus the distance to the target, and FSA is the full-scale area of the container holding the material being measured.

In the case of near field measurements, the basic operation of the sensor 20 remains unchanged. However, the sensor 20 determines the distance to target value, which is common to Equations 2–4, in a different manner. The microcontroller 22 treats a returned echo signal received at a time that is less than about twice the transducer's ring time as a near field measurement. The microcontroller 22 then looks for a second echo signal. If the second echo is received, then the time of flight difference between the two echo signals is used as the basis for calculating a distance measurement. If a second echo signal is not detected (as might be caused by the echo losing energy or diminishing in magnitude as it bounces back and forth between the target and sensor), the microcontroller 22 ignores the first echo signal detected and modifies the command signal to the transducer 32 to increase the transmit power until a second echo is detected.

Figure 4:
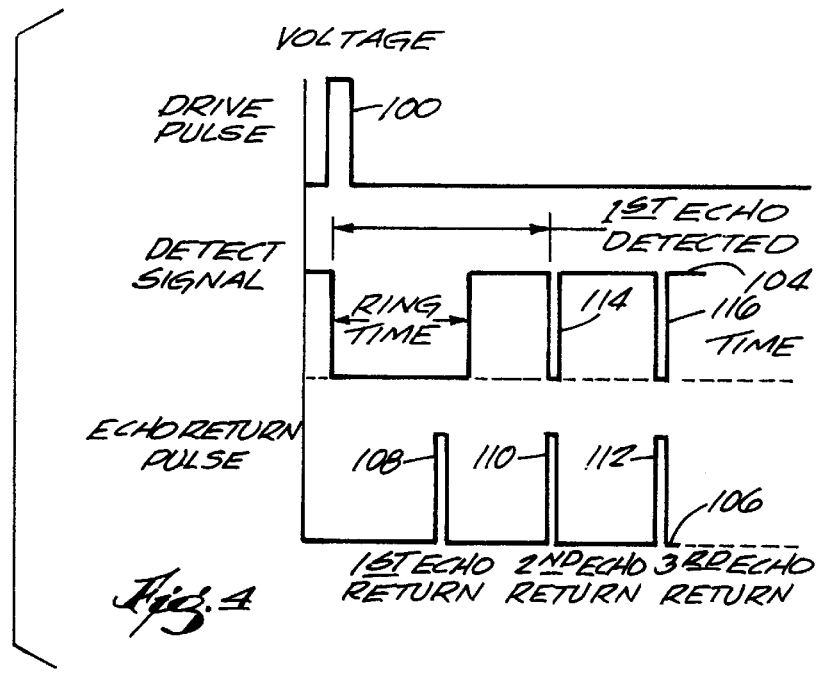
FIG. 4 is a waveform diagram illustrating multiple echo signals received in a near field situation.
Figure 5:
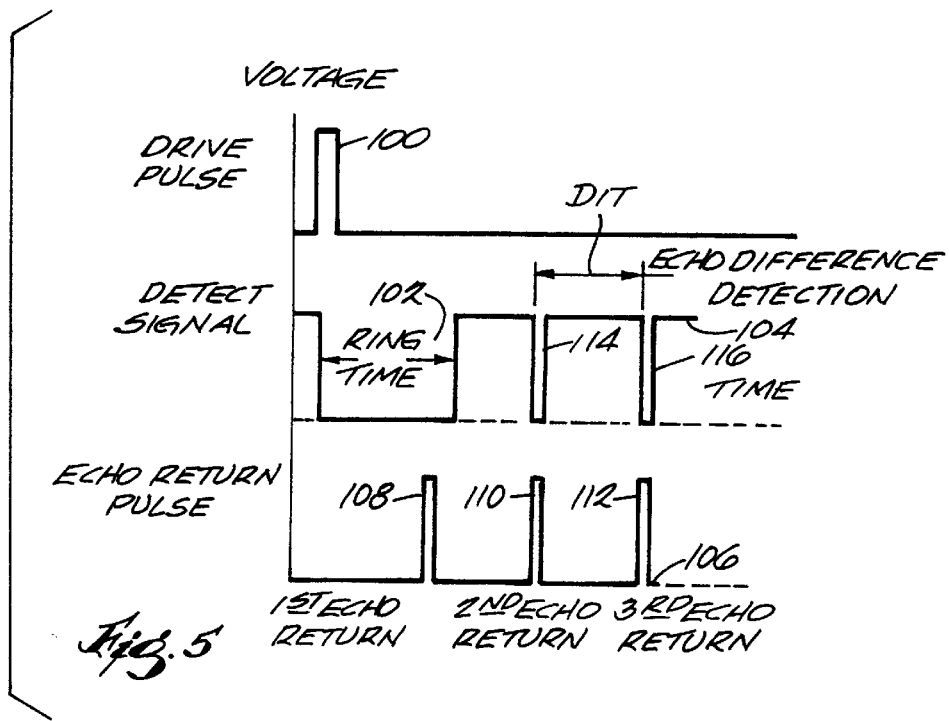
FIG. 5 is a waveform diagram illustrating multiple echo signals received in a near field situation and the measurement of the time difference between a second and third return echo signal.

The algorithm implemented by the invention can be more clearly seen by reference to FIGS. 4–7. As shown in FIG. 4, a drive pulse 100 causes the transducer 23 to vibrate for a certain ring time 102. The ring time is shown on the detect signal waveform 104. The sound wave generated by the transducer 23 reflects off a target and returns to the transducer in the form of an echo. In fact, an echo return pulse waveform 106 is formed. The echo pulse waveform 106 includes a first return echo 108, a second return echo 110, and a third return echo 112. The first echo return 108 is received at the transducer 32 during the ring time 102, but is not detected due to the ringing of the oscillator. When the oscillator stops ringing, the detect signal goes high until the second return echo 110 arrives. The second return echo generates a first echo detect signal 114. The third return echo 112 generates a second echo detect signal 116.

The microcontroller 22 of the sensor 20 is programmed to measure the ring time of the oscillator in the transducer 32 by monitoring the output of the transducer continuously following a trigger command. The microcontroller 22 considers the ring time complete once the detect returns high for a predefined period of time, which is long enough to ensure that the transition from low to high is a valid transition rather than a noise condition. For a 150 kHz transducer, an exemplary time is about 100 μsecs. In the embodiment described herein, a high voltage detect signal is treated as an "off" condition.

A ring time window, such as about two times the ring time is then determined by the microcontroller 22. The microcontroller 22 determines the ring time window whenever the first measured or detected echo occurs within a predetermined time period (represented by a constant "close_enough") following the ring period. A fixed ring time window of exactly twice the ring time does not produce acceptable results because a received echo could be returned exactly at the end of the transducer's ring period, causing the sensor to assume that the transducer is still ringing rather than sensing an echo. Preferably, the constant "close_enough"is chosen to be equal to or slightly greater than the worst-case measurement of ring time over an operating temperature range for the sensor 20. In the embodiment shown, a constant of 1.3 was used. The ring time window was then calculated as 1.3 times the transducer's nominal ring time plus the actual ring time.

When an echo signal is received within the ring time window, a near field flag is set by the microcontroller 22 to indicate that near field calculations should be carried out. In the near field case, the microprocessor measures the difference in time DIT between the first echo detect signal 114 and the second echo detect signal 116. (See FIG. 5.) Due to power dissipation caused by absorption and other phenomena, the magnitude of the third return echo 112 may be much lower than the magnitudes of the first and second return echoes 108 and 110. The resulting magnitude of the second echo detect signal 116 may be so low that that the second detect signal 116 is not recognized by the microcontroller 22. If the microcontroller 22 does not receive a recognizable second echo detect signal 116, then the values obtained for the first echo detect signal 114 are ignored, and the measurement process is repeated, but with a modified drive pulse. In particular the magnitude of the drive pulse is increased until an initial sound pulse is generated by the transducer 32 to produce a third return echo with a magnitude sufficient to generate a recognizable second echo detect signal. The magnitude of the drive pulse is increased by increasing the pulse width and the number of pulses.

Figure 6:
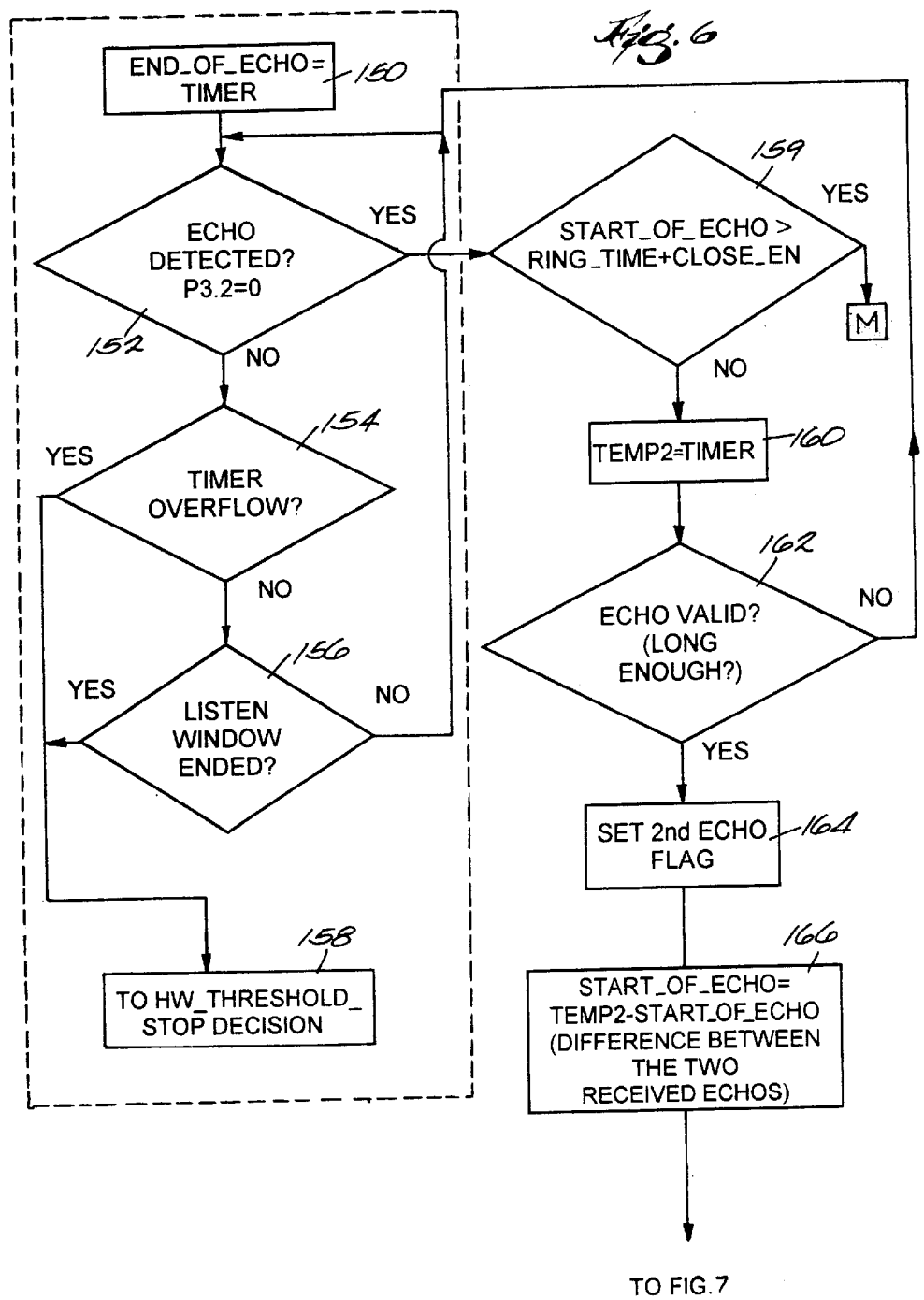
FIG. 6 is a flowchart of software used in the present invention.
Figure 7:
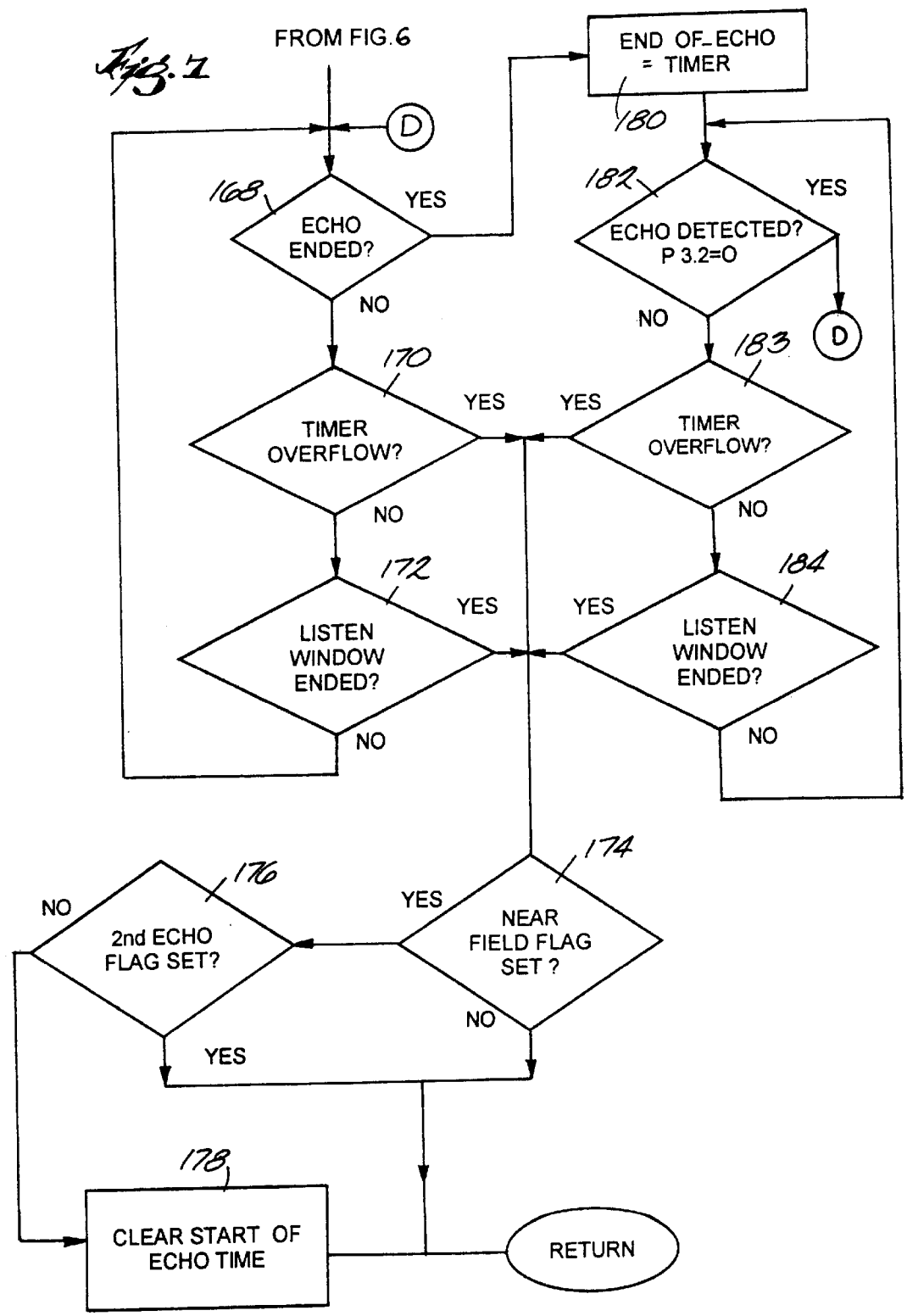
FIG. 7 is a flowchart of software used in the present invention.

As shown in FIGS. 6 and 7, the echo detection process implemented by the microcontroller 22 begins with step 150 where the ring time is measured by assigning an object "end_of_echo" the time value kept by an internal timer.

Once the ring time is measured, the microcontroller 22 checks at step 152 for the presence of an echo signal. The processor then checks at 154 to see if a timer overflow has occurred. If no overflow has occurred, the microcontroller 22 then checks at 156 to see if a listen window, a predetermined maximum time set for receiving an echo signal, has ended. If a timer overflow occurs or the listen window ends, the microprocessor 22 stops listening for echoes as shown at step 158. If the listen window is still active and no overflow has occurred, the microcontroller 22 continues to check for the presence of an echo.

Once an echo is received, the microcontroller 22 determines at 159 whether the echo signal was received within the ring time window, as discussed above. If the echo signal is outside of the ring time window then a standard, non-near field measurement analysis of the echo signal (as represented by module "M" in the drawing) is performed. If the echo signal is received within the ring time window, then a near field analysis is performed. The near field analysis begins at step 160 where an object, e.g., "temp2," is assigned the present time as kept by the internal timer. The microcontroller 22 then checks for the presence of a second echo at step 162. If a perceptible echo is not detected, the pulse signal to the transducer is modified (as described below) and the microcontroller starts the detection process over by returning to step 152. If a perceptible second echo is detected, a second echo signal flag is set at step 164. At step 166, the time difference between the first and second echo detect signals is determined.

In order to ensure that accurate measurements are made, the microcontroller 22 is programmed to ignore echo detect signals beyond the second echo detect signal. Thus, at step 168 the microcontroller checks to see if the second echo detect signal has ended (that is, the microcontroller determines if the voltage level has gone high). If the signal has not ended, the microcontroller checks the timer overflow and listen window errors at steps 170 and 172. If no errors have occurred then the microcontroller continues to check for the end of the second echo detect signal. If one or more errors do occur, the microcontroller checks to see if the near field flag was set at step 174. If the flag was not set, then the microcontroller starts the measurement process again. If the near field flag was set, then the microcontroller checks to see whether the second echo detect signal flag was set at step 176. If the second echo detect signal flag was not set, the microcontroller clears the start of echo time object at step 178 before returning to step 152.

If the microcontroller 22 successfully detects the end of the second echo detect signal, it assigns the present time value of the internal timer to an "end_of_echo" object at step 180. The microcontroller 22 then cycles through multiple detection loops in steps 182 through 184, following an exit/return path D—D, awaiting an overflow or the end of the listen window, which causes the microcontroller to exit the process. Once an exit has occurred, a new measurement process may begin by returning to step 152.

In the preferred embodiment, when driving the transducer 32 with a resonant pulse stream, Q (or quality factor) considerations for the transducer are disregarded in lieu of the microcontroller's fixed resolution constraint. Thus, the routine used to create the drive pulse is based on creating a linear change in frequency proportional to temperature with a step resolution of 1 NOP (no-instruction operation) cycle or 121 nsecs. In lower frequency designs, a Q measurement may be used so as to permit the use of a slower, less costly microcontroller 22 for applications where a 121 nsec resolution is not required.

To modify the drive pulse 100, the microcontroller 22 employs a multiple pulse resonance driving technique that relies on a look up table, such as the one shown in FIG. 8. Most commonly, ultrasonic transducers are excited with a single high voltage, DC pulse. In the invention, the sound output is controlled in a specific manner. In particular, the sound output of the transducer 32 is increased by increasing the magnitude of the pulse, the width of the pulse, or by resonating the transducer 32 with a series of pulses. This method of driving the transducer provides a convenient mechanism to change the amplitude of the acoustic wave by increasing or decreasing the number of pulses or duration of the pulse train. Since a transducer's resonant frequency changes with temperature, a variable frequency pulse generator (in the form of a software routine) is used to lock the drive signal onto the transducer's resonant frequency. As shown in FIG. 8, a look up table may be developed for the transducer 32 such that the output drive pulse frequency matches the transducer's temperature-dependent frequency characteristics. In addition, the resolution of the generator (drive circuit 30, microcontroller 22, and software) may be adjusted to compensate for the Q of the transducer such that a low Q transducer would be provided less resolution and a high Q transducer would be provided more resolution. In addition, the generator can compensate for phenomena that occur at temperature extremes (low temperatures and high temperatures), where more energy is required to excite the transducer. At such extremes, the duty cycle is increased to increase the amount of power provided to the transducer 32.

The transducer's resonant frequency may deviate from the nominal values shown in the look up table in FIG. 8. (Even transducers of the same type and model will have some deviation.) Therefore, the microcontroller 22 may be programmed to trim the drive frequency of the transducer 32 up or down, independent of temperature, to minimize the number of pulses required to drive the transducer. Specifically, in one embodiment of the invention the 'drive frequency of the transducer 32 is varied from 10% below the table value to 10% above the table in small increments, such as about 1% increments. Concurrently, the number of drive pulses is tracked. The drive frequency is offset or adjusted to a value that results in high performance, i.e., the frequency at which the least number of pulses produces a clear echo.

As can be seen from the above, the present invention provides a sensor that accurately calculates near field measurements. Various features and advantages of the invention are set forth in the following claims.

What is claimed is:

1. A near-field measurement sensor for measuring a value, the sensor comprising:
   a transducer; and
   a controller coupled to the transducer, the controller operable to generate a first command signal for the transducer, detect a first echo signal from the transducer, determine whether the first echo signal was received by the transducer within a near-field time, and, if the first echo signal was received within the near-field time,
   detect a second echo signal of a predetermined magnitude,
   if a second echo signal is not detected within a predetermined amount of time, ignore the first echo signal and generate a second command signal different than the first command signal, and
   repeat the detection of a first echo signal, the detection of a second echo signal, and the generation of a second command signal until a second echo signal is detected within the predetermined amount of time,
   the controller further operable to convert the first echo signal or the difference between the first echo signal and the second echo signal to a measurement value.

2. A near-field measurement sensor as claimed in claim 1, wherein the controller converts the first echo signal or the difference between the first echo signal and the second echo signal to a distance measurement.

3. A near-field measurement sensor as claimed in claim 1, wherein the controller converts the first echo signal or the difference between the first echo signal and the second echo signal to a volumetric representation of an amount of material in a container.

4. A near-field measurement sensor as claimed in claim 1, wherein the transducer has a ring time and the controller is operable to determine the ring time of the transducer.

5. A near-field measurement sensor as claimed in claim 4, wherein the near-field time is greater than the ring time of the transducer.

6. A near-field measurement sensor as claimed in claim 1, further comprising a driver coupled between the controller and the transducer.

7. A near-field measurement sensor as claimed in claim 1, further comprising a conditioning circuit coupled to the transducer.

8. A near-field measurement sensor as claimed in claim 1, further comprising a temperature sensor coupled to the controller.

9. A near-field measurement sensor as claimed in claim 1, further comprising a communications module coupled to the controller.

10. A near-field measurement sensor as claimed in claim 1, wherein the controller further comprises a look up table and the look up table is used to generate a variable command signal.

11. A near-field measurement sensor as claimed in claim 1, wherein the controller is operable to control the second command signal so that the transducer is driven with a series of pulses.

12. A near-field measurement sensor as claimed in claim 11, wherein the controller is a programmable computer.

13. A near-field measurement sensor as claimed in claim 11, wherein the transducer is an ultrasonic transducer.

14. A near-field measurement sensor as claimed in claim 11, wherein the second command signal is controlled such that the frequency of the pulses matches the transducer's temperature-dependent frequency characteristics.

15. A near-field measurement sensor as claimed in claim 11, wherein the duration of the second command signal is increased when the transducer is operated at high temperatures.

16. A near-field measurement sensor as claimed in claim 11, wherein the duration of the second command signal is increased when the transducer is operated at low temperatures.

17. A near-field measurement sensor as claimed in claim 11, wherein the frequency of the second command signal is continuously changed to optimize the detection of the echo signal.

18. A near-field measurement sensor for measuring a value, the sensor comprising:
   a transducer;
   a driver coupled to the transducer;
   a temperature sensor; and
   a controller coupled to the driver and to the temperature sensor, the controller operable to generate a command signal having a variable pulse width and a variable frequency, to deliver the command signal to the driver, to detect an echo signal from the transducer according to a timing scheme, and to continuously update the pulse width and frequency of the command signal.

19. A near-field measurement sensor as claimed in claim 18, further comprising a conditioning circuit that conditions echo signals detected by the transducer, the conditioning circuit coupled between the controller and the transducer.

20. A near-field measurement sensor as claimed in claim 18, further comprising a communications module coupled to the controller.

21. A near-field measurement sensor as claimed in claim 18, wherein the transducer has a ring time and the controller is operable to determine the ring time of the transducer.

22. A near-field measurement sensor as claimed in claim 18, wherein the controller further comprises a look up table used to update the command signal.

23. A near-field measurement sensor as claimed in claim 18, wherein the second command signal: is controlled using a look up table.

24. A near-field measurement sensor as claimed in claim 18, wherein the second command signal is controlled such that the frequency of the pulses matches the transducer's temperature-dependent frequency characteristics.

25. A near-field measurement sensor as claimed in claim 18, wherein the duration of the second command signal is increased when the transducer is operated at high temperatures.

26. A near-field measurement sensor as claimed in claim 18, wherein the duration of the second command signal is increased when the transducer is operated at low temperatures.

27. A near-field measurement sensor as claimed in claim 18, wherein the frequency of the second command signal is continuously changed to optimize the detection of the echo signal.

28. A near-field measurement sensor as claimed in claim 18, wherein the controller is a programmable computer.

29. A near-field measurement sensor as claimed in claim 18, wherein the transducer is an ultrasonic transducer.

30. A near-field measurement sensor comprising:

a transducer; and a controller coupled to the transducer, the controller operable to generate a first command signal for the transducer, detect a first echo signal from the transducer, determine whether the first echo signal was received by the transducer within a near-field time, and if the first echo signal was received within the near-field time, detect a second echo signal of a predetermined magnitude, if a second echo signal is not detected within a predetermined amount of time, ignore the first echo signal and generate a second command signal different than the first command signal, repeat the detection of a first echo signal, the detection of a second echo signal, and the generation of a second command signal until a second echo signal is detected within the predetermined amount of time, and convert the first echo signal or the difference between the first echo signal and the second echo signal to a linear distance representation of the distance to a target.

* * * * *